US010112119B2

(12) United States Patent
Nicholson et al.

(10) Patent No.: US 10,112,119 B2
(45) Date of Patent: Oct. 30, 2018

(54) METHOD FOR MODIFYING LOCAL PROPERTIES OF MATERIALS

(71) Applicant: Disney Enterprises, Inc., Burbank, CA (US)

(72) Inventors: Nolan Andrew Nicholson, Sacramento, CA (US); Alexander W. Hsing, Glendale, CA (US); Philip Jackson, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 319 days.

(21) Appl. No.: 14/935,615

(22) Filed: Nov. 9, 2015

(65) Prior Publication Data
US 2017/0128848 A1    May 11, 2017

(51) Int. Cl.
C08J 9/40       (2006.01)
A63H 13/00      (2006.01)
B29C 71/02      (2006.01)
C08J 3/20       (2006.01)

(52) U.S. Cl.
CPC ............... A63H 13/00 (2013.01); C08J 3/20 (2013.01); C08J 7/08 (2013.01); C08J 2300/22 (2013.01)

(58) Field of Classification Search
CPC ..... A63H 13/00; C08J 3/20; C08J 7/08; C08J 2300/22; C08J 9/40
USPC ....... 428/411.1; 446/373; 427/337, 331, 375
See application file for complete search history.

(56) References Cited

U.S. PATENT DOCUMENTS

| | | | | | |
|---|---|---|---|---|---|
| 4,481,001 | A | * | 11/1984 | Graham | G09B 23/285 434/267 |
| 4,583,247 | A | * | 4/1986 | Fingerhut | A41D 27/06 2/272 |
| 5,702,818 | A | * | 12/1997 | Cahalan | A61L 33/0005 428/409 |
| 6,319,599 | B1 | * | 11/2001 | Buckley | A61F 7/02 428/308.4 |
| 6,685,533 | B1 | * | 2/2004 | Lee | A63H 3/36 434/274 |
| 7,008,979 | B2 | * | 3/2006 | Schottman | C08K 3/22 428/411.1 |
| 7,819,719 | B2 | * | 10/2010 | Tye | A63H 11/00 446/268 |
| 7,857,625 | B2 | * | 12/2010 | Gomo | G09B 23/30 434/267 |
| 8,313,523 | B2 | * | 11/2012 | Banas | A61F 2/06 623/1.28 |
| 9,549,746 | B2 | * | 1/2017 | Woolfson | |
| 2004/0018799 | A1 | * | 1/2004 | Lee | A63H 3/36 446/373 |
| 2009/0171258 | A1 | * | 7/2009 | Stroebeck | A61L 15/58 602/54 |
| 2009/0191156 | A1 | * | 7/2009 | Brem | A61K 8/64 424/93.2 |
| 2010/0256064 | A1 | * | 10/2010 | Woolfson | A61B 17/205 514/15.2 |
| 2011/0087152 | A1 | * | 4/2011 | David | A61K 8/02 604/20 |
| 2013/0046209 | A1 | * | 2/2013 | Slayton | A61N 7/02 601/3 |
| 2013/0251695 | A1 | * | 9/2013 | Farmer | A61K 8/99 424/93.46 |
| 2013/0288565 | A1 | * | 10/2013 | McMullen | A63H 3/365 446/321 |
| 2014/0356419 | A1 | * | 12/2014 | Gujral | A61K 8/97 424/450 |
| 2015/0125611 | A1 | * | 5/2015 | Nagai | A61L 15/60 427/331 |
| 2016/0339349 | A1 | * | 11/2016 | Hsing | B29C 65/48 |

* cited by examiner

Primary Examiner — Douglas J McGinty
(74) Attorney, Agent, or Firm — Dorsey & Whitney LLP

(57) ABSTRACT

The present disclosure includes a method for altering one or more properties of a primary material. The method includes reducing the elasticity of a primary material and creating a delivery aperture through an outer layer of the primary material. Once the delivery aperture is created, or as the delivery aperture is created, introducing through the delivery aperture a secondary material into a sublayer of the primary material and applying a closure treatment to the primary material to close the delivery aperture. The secondary material includes one or more properties that are different from the primary material. By introducing the secondary material into the primary material, the secondary material locally changes the properties of the primary material. Examples of the variable properties include color, strength, flexibility, magnetism, and optical.

22 Claims, 5 Drawing Sheets

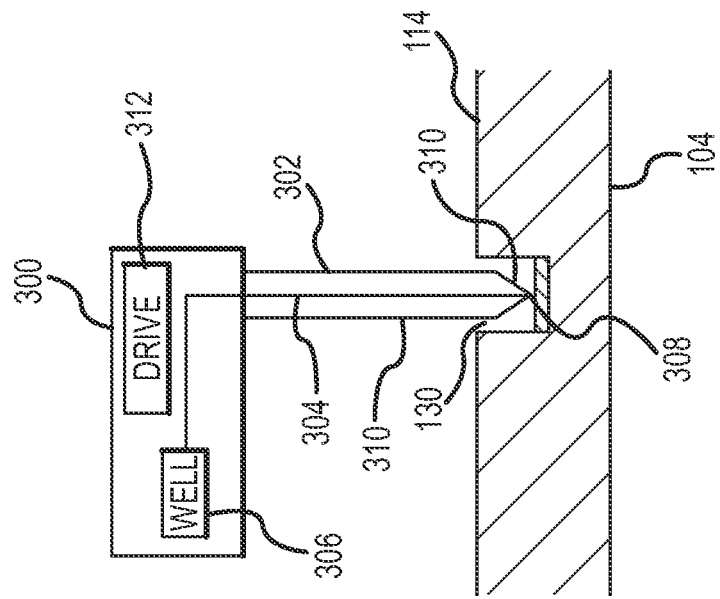
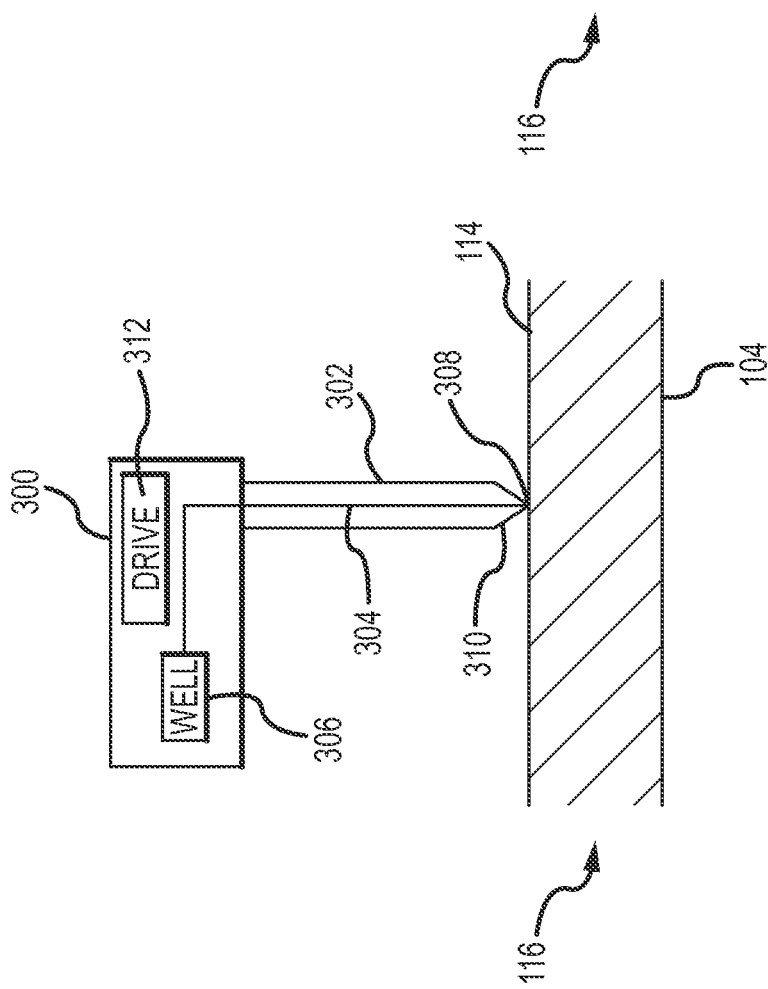

METHOD FOR MODIFYING LOCAL PROPERTIES OF MATERIALS

TECHNICAL FIELD

This invention relates generally to techniques to modify local properties of materials.

BACKGROUND

Durable, flexible materials are often used as skins or coverings that are applied to an internal physical structure. For example, silicone rubber is often used to create realistic models of humans, animals, and fantasy characters, and when combined with robotics, such models can accurately simulate live animals, persons, or characters.

The design of such skins presents a particular unique challenge. Specifically, the skin must be robust enough to withstand prolonged used and exposure to environmental conditions. The skin must also be realistic in appearance, movement, and texture to accurately imitate the person or animal it resembles. The skin must also be easily formed and easy to handle and attach to a physical support structure or skeleton. To create a realistic appearance and deformation, soft elastomers are typically used to create skin. Some elastomers, such as silicone rubber, can be painted by applying pigment to an outer surface. However, painting can hide or modify the outer texture of the skin, which may affect the desired appearance. Additionally, silicone rubber is often quite heavy, which requires powerful robotics to move the internal structure to which the skin is attached.

Many thermoplastic elastomers, such as styrene-butadiene rubber, are lighter weight than silicone rubber and have mechanical properties that are often preferred for animatronic structures. For example, styrene-butadiene rubber is more flexible and can stretch easier than silicone rubber. However, the increased elongation that allows for the increased flexibility also causes paint to peel off or otherwise not adhere to styrene-butadiene rubber for long periods of time, eliminating painting as a viable option for coloring the material. Some thermoplastic elastomers can be colored using "negative painting" techniques where the material is molded with another colored material to create a colored structure. Negative painting techniques are time consuming, difficult to use to create multi-colored materials, and very difficult to use to create highly detailed colored designs. As such, although thermoplastic elastomers such as styrene-butadiene rubber, have preferred mechanical properties as compared to conventional skin materials, they have not been used due to inability to efficiently and permanently color the materials.

BRIEF SUMMARY

The present disclosure generally provides a method for altering one or more properties of a primary material. The method includes reducing the elasticity of a primary material and creating a delivery aperture through an outer layer of the primary material. Once the delivery aperture is created, or as the delivery aperture is created, the method includes introducing through the delivery aperture a secondary material into a sublayer of the primary material and then applying a closure treatment to close the delivery aperture. The secondary material includes one or more properties that are different from the primary material. By introducing the secondary material into the primary material, the secondary material changes the properties of the primary material at the injection location. Examples of the variable properties include color, strength, flexibility, magnetism, thermal, and/or optical properties.

In another embodiment, the present disclosure includes an artificial skin manufacturing method. The method includes thermally treating a skin material until an elasticity of the skin material drops below a predetermined level, piercing the outer surface of the skin material to create a passage to an inner layer of the skin material, and injecting an enhancement material into the inner layer of the skin material.

In yet another embodiment, the present disclosure includes an artificial skin. The artificial skin includes a base material having an outer surface and one or more sublayers and an enhancement material embedded in a sublayer of the base material. The artificial skin can be applied to an animatronic by being coupled to the internal support structure.

The present disclosure is set forth in various levels of detail in this application and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. It should be understood that the claimed subject matter is not necessarily limited to the particular embodiments or arrangements illustrated herein.

BRIEF DESCRIPTION OF THE DRAWINGS

The accompanying drawings, which are incorporated into and constitute a part of the specification, illustrate examples of the disclosure and, together with the general description given above and the detailed description give below, serve to explain the principles of these examples.

FIG. 3A is a partial cross-section view illustrating an injection device creating an injection aperture in the primary material.

FIG. 3B is a partial cross-section view illustrating the injection device of FIG. 3A depositing the enhancement material in a sublayer of the primary material.

DETAILED DESCRIPTION

The present disclosure is directed to a method for changing one or more local properties of an elastomeric material. The method can be used to create artificial skins, such as those for animatronic characters or scenic displays, and allows the use of certain materials, such as thermoplastic elastomers, that are lighter weight and have increased flexibility as compared to conventional materials typically used for artificial skins.

The method includes pretreating the primary material with a thermal treatment to temporarily vary the elastic properties of the primary material. For example, heating or cooling the primary material for a predetermined period of time acts to reduce the elasticity of the primary material. After the pretreatment, the outer surface, and optionally one or more layers of the primary material, are pierced with a needle to inject an enhancement material into a sublayer of the primary material. After injection, a closure treatment is applied to the primary material to close the delivery apertures created by the needle. The closure treatment depends on the material, but with amorphous polymer materials, such as styrene-butadiene rubbers, the closure treatment includes heating the primary material to begin flow, i.e., to the glass transition temperature and/or at a point within the glass transition range. For crystalline materials, the closure treatment includes heating the primary material near the melting point of the material or otherwise sufficient to cause closure of the puncture apertures.

Using the method of the present disclosure, an enhancement material, such as a pigment, can be accurately delivered to locations in the primary material, and localizing the dispersion in one or more punctures allows the enhancement material to move or stretch with the primary material, reducing fatigue. Additionally, the enhancement material can be selected to vary properties, other than color, of the skin material. For example, the enhancement material can impart mechanical, thermal, magnetic, and/or optical properties to the primary material.

With the methods presented herein, styrene-butadiene rubber (SBR) can be efficiently colored with desired aesthetic designs, which allows this material to be used as an artificial skin for animatronic characters. SBR is more flexible and stretches more than silicone rubber and can be easily heat molded into various shapes. Due to the decreased weight of SBR as compared to silicone rubber, robotics and other machinery for moving animatronic characters can operate with less torque, allowing more efficient, less powerful, and smaller machines to operate animatronic characters.

Figure 1A:
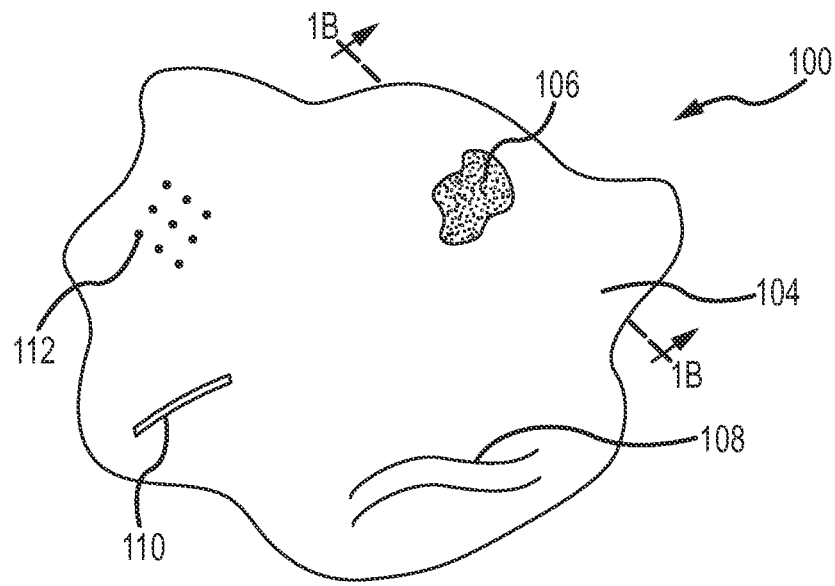
FIG. 1A is a top plan view of a composite material including a primary material having multiple enhancement materials embedded therein.
Figure 1B:
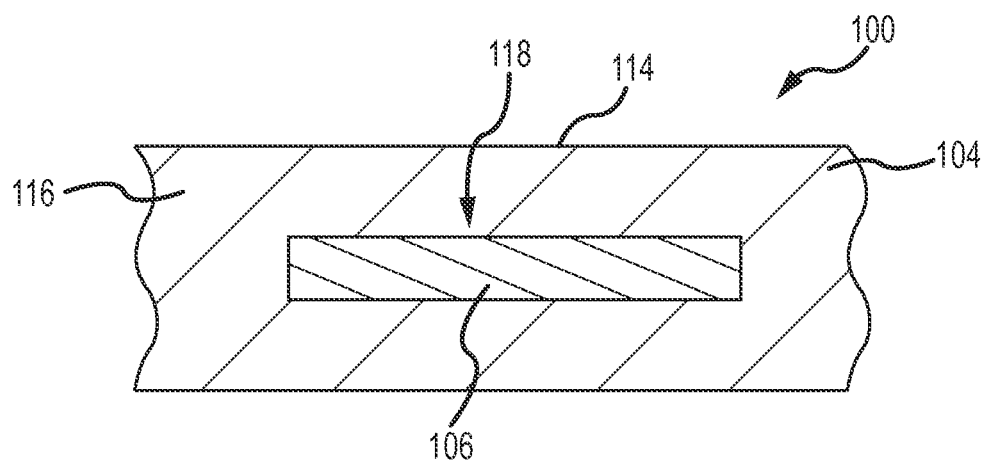
FIG. 1B is a cross-section view of the composite material of FIG. 1 taken along line 1B-1B in FIG. 1A.

FIG. 1A is a top plan view of a composite including a primary material injected with multiple enhancement materials. FIG. 1B is a cross-section view of the composite material of FIG. 1A taken along line 1B-1B. With reference to FIG. 1A, the composite material 100 includes a primary material 104 and multiple enhancement materials 106, 108, 110 deposited therein. The primary material 104 serves as a base for receiving the enhancement materials 106, 108, 110 and forms the main component of the composite material 100. The enhancement materials 106, 108, 110 are deposited in different locations and/or depths, in different shapes and concentrations to vary the properties of the primary material 104 at the deposited locations.

With reference to FIG. 1A, a first enhancement material 106 is used to vary the appearance of the primary material 104. The first enhancement material 106 is a pigment having a different hue than the primary material 104 and is used to vary the color appearance of the primary material 104. Examples of the first enhancement material 106 include inks, pigments, paints, or the like. The first enhancement material 106 is selected based on a desired appearance and the primary material 104. For some thermoplastic elastomers, oil based inks may be preferable as these materials more easily solubilize with oil-based elastomers. That is, pigment mixed with a plasticizing oil or similar oil based material may more easily integrate with the primary material. Inks including pigments and carriers such as tattooing inks can be used as an enhancement material. Depending on the binder, certain paints may not elongate with the primary material and so the characteristics of the first enhancement material are selected to ensure that the properties of the material do not adversely affect the desired characteristics of the primary material. It should be noted that the percentage or saturation of the pigment can be varied to create a more or less saturated appearance. Along those lines, the depth, injection angle, and other factors can be used to also vary the appearance and effect of the enhancement material.

The second enhancement material 108 is used to enhance the flexibility of the primary material 104 and has a durometer rating less than or greater than the then primary material 104. In an embodiment where the durometer rating is less than the primary material, the second enhancement material introduces a flexible section into the primary material 104 that can bend more easily than the other areas of the primary material 104. The third enhancement material 108 is a magnetic element and introduces or enhances a magnetic field for the primary material 104. In this example, the third enhancement material 108 is any type of magnetic element, such as iron, nickel, cobalt, metallic alloys, or the like. A fourth enhancement material 112 alters the optical properties of the primary material 104 and is any material having an different appearance under one or more types of light waves. For example, the fourth enhancement material 112 can be an ultraviolet pigment or material that glows when exposed to ultraviolet light. Other types of enhancement materials can be used as well. For example, materials that react with changes in temperature, or materials that have an increased tolerance to heat or stress can be used.

As shown in FIG. 1A, the various enhancement materials 106, 108, 110, 112 are embedded in different shapes, quantities, and locations within the primary material 104. These characteristics can be varied as desired to create a composite material 100 with certain properties. Additionally, it should be noted that in many instances the composite material 100 will include a single type of enhancement material, but in others two or more types of enhancement materials can be used.

The enhancement materials 106, 108, 110, 112 are positioned in one or more sublayers of the primary material 104. For example, with reference to FIG. 1B, the first enhancement material 106 is located in a sublayer 116 of the primary material 104, which is below the outer surface 114 of the primary material 104. In this example, the hue of the enhancement material 106 is visible through the outer surface 114 of the primary material 104 and acts to change the appearance of the primary material 104 at the deposit location 118. However, in other examples, such as with the second enhancement material 108, where the local property changed is not an aesthetic one, but a mechanical property, the enhancement material 108 can be embedded further into the primary material 104, such as at a lower depth or in a lower sublayer.

Figure 2:
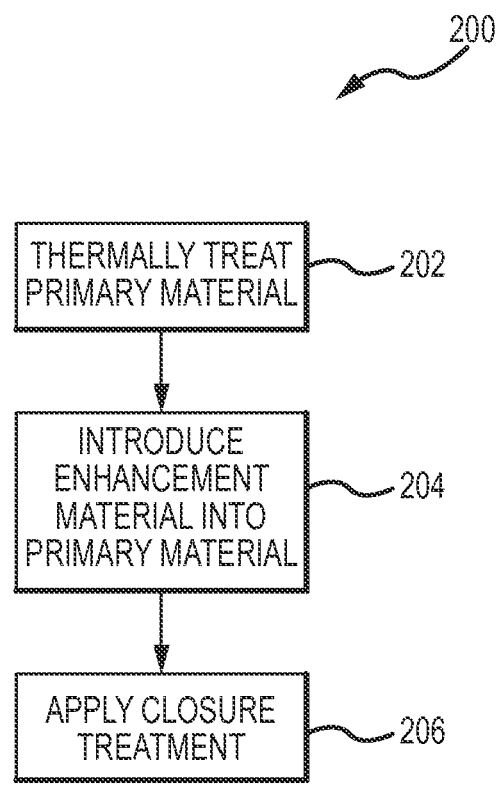
FIG. 2 is a flow chart illustrating a method for creating the composite material of FIG. 1.

FIG. 2 is a flow chart illustrating a method 200 for creating the composite material 100. With reference to FIG. 2, the method 200 begins with operation 202 and the primary material 104 is thermally treated. The thermal treatment reduces the elasticity of the primary material 104 and may be a heat treatment or a cooling treatment. With a heat treatment, the primary material 104 is heated past the glass transition point (or to a temperature falling within the range of the glass transition). With a cooling treatment, the primary material 104 is cooled until the material becomes sufficiently brittle to allow a needle to puncture through the outer surface, rather, i.e., the material will break, rather than deforming with the insertion of the needle.

Examples of the primary material include thermoplastic elastomers, such as SBR, thermoplastic polyurethane, polyolefins, polyamides, copolyesters, and so on. Other materials include silicone, styrene family materials, materials that respond in a similarly to heating or cooling as thermoplastic elastomers, and materials that react with chemicals to create an exothermic reaction.

In one example, the primary material 104 is SBR and the thermal treatment included heating the material with a box furnace heated to 266 Fahrenheit for 8-12 minutes, preferably 10 minutes. This temperature and heating time reduced the elasticity of SBR to allow the material to be pierced by a sharp object, such as a needle. That is, during heating, the SBR moved from the elastic region to the plastic region to allow a sharp object to pierce just below the outer surface of the material. In this example, SBR transitioned from a Young's Modulus of approximately 0.001 GPa in a rubbery state material to a viscous fluid. In another example, using SBR again as the primary material, a cooling treatment was applied and the SBR was cooled in a freezer (0 to 38 degrees Fahrenheit), preferably at 0 degrees Fahrenheit for approximately 30 minutes. As with the heat treatment, the cooling treatment sufficiently reduced the elasticity of the SBR to allow it to be pierced by a sharp object. For example, SBR in this embodiment transitioned from having a Young's Modulus of approximately 0.001 GPa to approximately 0.5 GPa.

Depending on the type of enhancement material to be injected, the heating thermal treatment may be preferable. In particular, when pigments, inks, or paints are injected into the primary material, the heat thermal treatment allows the colored material to spread more evenly within the primary material. Additionally, with a cooling thermal treatment, in some instances precipitation, such as oil or water droplets, may form on the outer surface of the primary material, which can smudge the colored material, affecting the desired aesthetic design.

In some embodiments, the thermal treatment can be applied through a chemical reaction of the primary material, e.g., a hot or cold external or internal reaction. For example, an exothermic reaction in the primary material can be generated that sufficiently heats the primary material to reduce the elasticity of the material.

With reference to FIG. 2, after operation 202, the method 200 proceeds to operation 204. In operation 204, one or more of the enhancement materials 106, 108, 110, 112 are introduced into the primary material 104. In one embodiment, the enhancement material 106, 108, 110, 112 is injected into the primary material 104 through an injection machine. FIGS. 3A and 3B illustrate an example of the injection machine 300. As shown in FIGS. 3A and 3B, the injection machine 300 includes a needle 302 having a piercing end 310 with a port 308 on the tip, a well 306 for storing the enhancement material, and a passage 304 for fluidly connecting the port 308 with the well 306. The injection machine 300 also includes a drive assembly 312 for moving the needle 302 vertically relative to the outer surface 114 of the primary material 104. The drive assembly 312 may also be used to pressurize or force the enhancement material into the primary material 104.

To introduce the enhancement material 106, 108, 110, 112 into the sublayer 116 of the primary material 104, the drive assembly 312 exerts a downward force on the needle 302, causing the piercing end 310 to create an injection aperture 130 in the primary material 104. Depending on the desired deposit depth of the enhancement material, the injection aperture 130 extends through the outer surface 114 and into the sublayer 116. When the piercing end 310 reaches the deposit depth, the enhancement material stored in the well 306 travels through the passage 304 and out the port 308 into the primary material 104. Once the enhancement material has been deposited, the drive assembly 312 drives the needle 302 upward and out of the primary material 104. The drive assembly 312 and/or a user move the injection machine 300 to another location on the outer surface 114 of the primary material 104 to inject the enhancement material 106, 108, 110, 112 in other locations. By varying the injection locations, the user can create a desired placement of the enhancement materials 106, 108, 110, 112.

In some embodiments, the injection machine 300 is configured to pressurize the enhancement material to force the material into the injection aperture. Pressurizing the material allows the enhancement material to be deposited in a more uniform manner as compared to non-pressurized injection. As another example, the injection can be done in a centrifuge or centrifuge-like system. In this example, the injection apertures are created before the material is placed in the centrifuge (e.g., through a pre-perforated surface or an injection forming operation). The enhancement material is then positioned in the middle area of the centrifuge and when activated, the centrifugal force of the centrifuge forces the enhancement material into the injection apertures formed in the primary material. This example allows for a faster application rate than other embodiments, as large sections of the primary material can be injected substantially simultaneously. However, the application of the enhancement material injection is not as controlled as with other embodiments.

In many embodiments, the enhancement materials are injected into a sublayer relatively close to the outer surface, e.g., between 0.1 to 4 mm. However, depending on the desired injection depth the thermal treatment can be varied. For example, for increased depths, the thermal treatment temperature and/or time may be reduced as the insertion depth may extend past the deformation of the material, i.e., as the insertion depth increases, the ability of the material to deform to that depth decreases, so with deeper depths less thermal treatment may be required. In addition to varying the depth of the injection, the angle of injection may also be varied to create a desired aesthetic effect. For example, the enhancement material may be injected at an angle relative to the outer surface of the primary material in order to create a longer channel of deposit in the primary material. The angle may vary from a shallow angle to an angle substantially perpendicular relative to the outer surface. The injection angle also can control the overall effect of the enhancement material. For example, with pigment as the enhancement material, injecting at a shallower angle can create a more saturated appearance of color.

Depending on the final application for the composite material, the injection surface of the primary material is varied. For example, if a texture or other outer surface covering is molded or otherwise created in the top outer surface, the bottom outer surface can be selected as the injection surface. In this example, the injection depth often will be larger than when injected through the top outer surface to allow the enhancement material to be positioned close to the top outer surface (or as otherwise determined based on the desired effect). With this example, the outer texture of the top surface will not be affected during the injection and closure operations of the method. Alternatively, if an outer texture on the top surface is desired and the top surface is also used as the injection surface, the texturing or detailing of the top surface can be modified to be overly sculpted in order to compensate for the subsequent injection and re-forming of the material so that during the method 200 the changes to the outer texture are taken into account so that the final texture has the desired aesthetic appearance.

It should be noted that other types of injection machines may be used. Examples include a rotary tattoo machine, a coil tattoo machine, a liner tattoo machine, a shader tattoo machine, and a pneumatic tattoo machine. As another example, the piercing element and the injection element may be separated from one another. For example, an injection machine having a separate needle and a pressurized delivery tube can be used to pierce the primary material in a first step and then deliver the enhancement material in a second step. The type of drive assembly for the needle 302, as well as the well 306 configuration may be varied as desired based on the type of primary and enhancement materials, the amount of material to be injected, and the deposit depth. As such, the above examples are meant as illustrative only.

As yet another example, the injection or deposit apertures are pre-formed in the material. For example, the primary material can be molded to include a perforated surface. As another example, sections of the primary material can be removed to define the injection or deposit apertures.

During operation 204 while the enhancement material 106, 108, 110, 112 is being injected into the primary material 104, the thermal treatment of operation 202 may be repeated or may be on-going. In order to maintain the desired reduction in elasticity and allow the needle 302 to continue to easily pierce the outer surface 114, the primary material 104 may be thermally treated during the injection operation. In a first example, a localized thermal treatment, such as a heat gun or cooling treatment, can be used to locally heat the primary material 104 at the deposit location during injection. As a second example, the entire primary material 104 section may be returned to the thermal treatment intermittently. In a third example, the primary material 104 is placed on a component, such as a core or a surface, with insulative properties and/or heating/cooling capabilities. In this example, the thermal component will continue to thermally treat the primary material while the primary material is being injected with the enhancement materials. The thermal component can have a shape corresponding to the shape of the primary material (e.g., a three dimensional shape) or may be a planar surface or the like. With a fourth example, the injection may be completed in a thermally controlled environment.

Figure 4A:
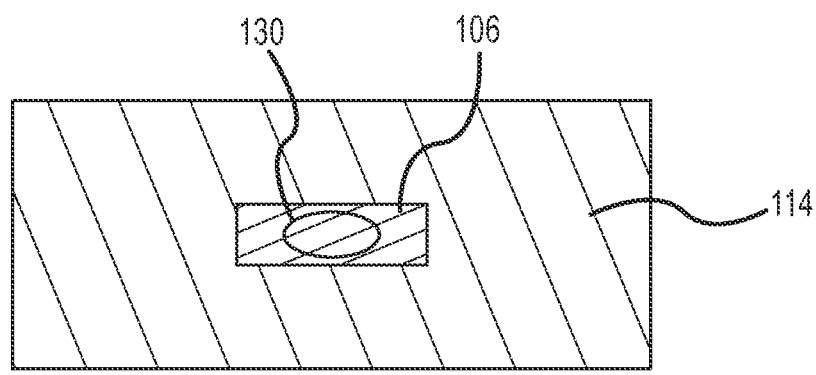
FIG. 4A is a top plan view of the composite material after injection of the enhancement material.
Figure 4B:
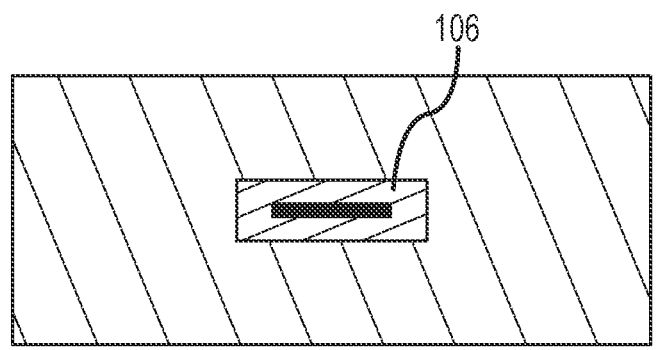
FIG. 4B is a top plan view of the composite material of FIG. 4B after a closure treatment is applied.

With reference again to FIG. 2, once the enhancement material 106, 108, 110, 112 has been injected, the method 200 proceeds to operation 206. In operation 206, a closure or finishing treatment is applied to the primary material 104. With reference to FIG. 4, after injection, the injection aperture 130 may be visible in the outer surface 114 of the primary material 104. The diameter and depth of the injection aperture 130 will vary, but as the diameter increases, the injection aperture 130 will be more visible after injection. Using a closure treatment, the injection aperture 130 is sealed as shown in FIG. 4B. The closure treatment depends on the type of primary material 104 used but in many embodiments includes heating the primary material to a temperature at or near the glass transition temperature so the material begins to flow. As the material begins to flow, the injection apertures 130 close and the linkages in the primary material 104 reform. In another embodiment, the closure treatment includes applying a chemical, such as a solvent, to the outer surface 114 of the primary material.

In embodiments where the composite material is to be shaped in a predetermined manner or have a specific outer texture, the primary material with the injected enhancement material can be placed back into the creation mold (or another mold having the desired shape) and the closure treatment is then applied while the material is in the mold. In this manner, the material is shaped and/or textured after the application of the enhancement material.

In an example using SBR, during the closure treatment, the primary material 104 was heated to 266 degrees Fahrenheit for about 10 minutes, which was sufficient to close the punctures caused by the injection process. With this temperature and heating time, the primary material 104 softened without melting or losing its shape, but was sufficient to allow the SBR to plasticize and close the delivery apertures. In another example using SBR, an acrylics adhesive such as SCIGRP 3 or SCIGRIP 4 which includes methylene chloride, trichloroethylene, methyl methacrylate monomer was applied to the outer surface 114 of the SBR, which caused the SBR to dissolve at the outer surface 114 and upon evaporation of the solvent, the SBR reformed linkage, closing the injection apertures 130 and an even crosslink of SBR. Depending on the type of primary material and enhancement material, the type of solvent/adhesive can be varied.

In examples where the primary material includes predefined injection apertures or a porous surface, the closure treatment can also include application of additional material that is inserted into the perforations or injection apertures to further close the injection apertures. The application of additional material can be done in a number of ways. In one example, a centrifugal force can be used to deposit the additional material into the injection apertures in the same way as described above for application of the enhancement material. However, when used as a closure treatment the centrifugal force may also be combined with a heat treatment to allow the additional material to be better incorporated into the primary material.

Figure 5:
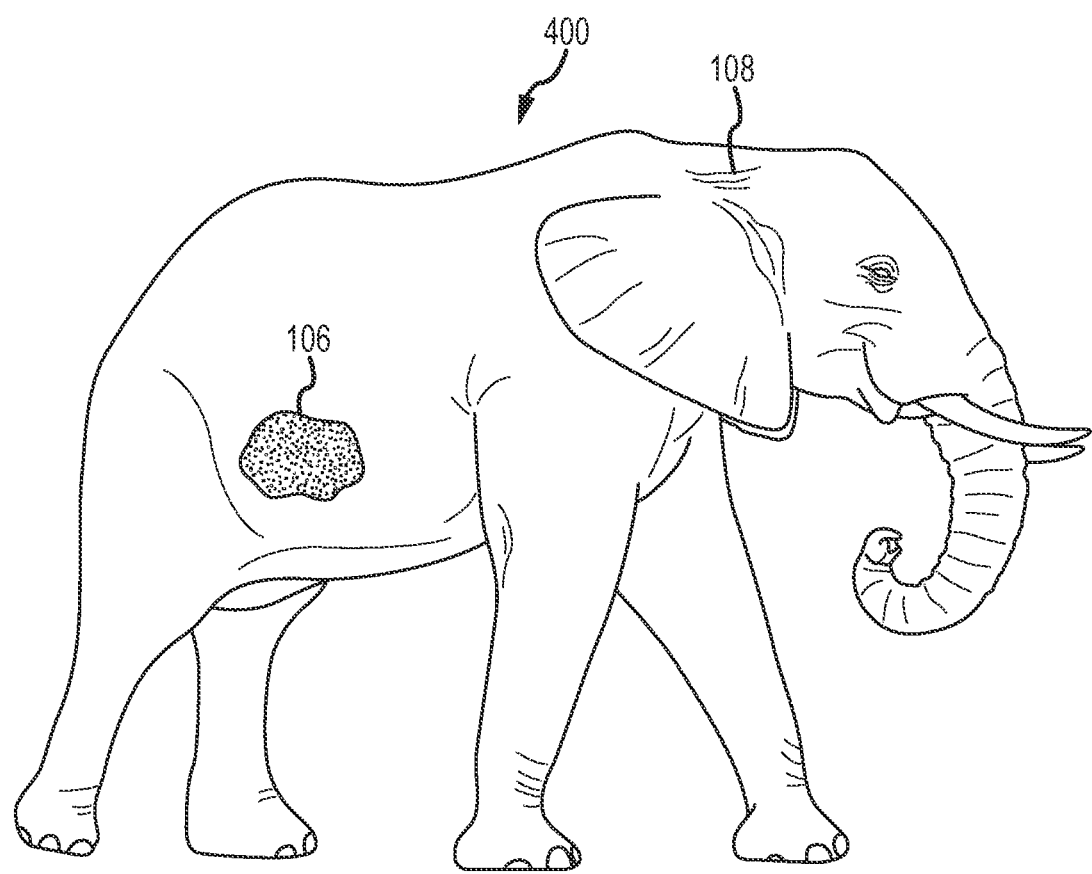
FIG. 5 is a side elevation view of an animatronic including an artificial skin created with the composite material.

After the closure treatment operation 206 has completed, the composite material 100 is ready for use. With reference to FIG. 5, the composite material 100 can be coupled to an internal structure of an animatronic 500. In this embodiment, the aesthetic and/or secondary properties provided by the enhancement materials 106, 108, 110, 112 are apparent through the primary material 104. For example, the color of the first enhancement material 106 is viewable through the primary material 104 to provide an aesthetic pleasing color, which may be more realistic to the character represented by the animatronic 500. Because the first enhancement material is deposited under the outer surface, the first enhancement material may be less likely to fade or otherwise be affected by exposure to environmental elements. Additionally, the injection method and the position of the first enhancement material 106 allows the pigment to stretch and move correspondingly with the primary material creating a realistic appearance.

As another example, the second enhancement material 108 can be added to the primary material 104 at a location corresponding to the neck of the animatronic 500 which may be moved by robotics. In this example, the enhancement material 108 allows the neck portion to stretch or flex to a greater degree than the other areas of the skin of the animatronic 500 since the second enhancement material 108 includes a lower durometer material as compared to the primary material 104. In this example, the variable durometer composite moves in a more realistic manner, e.g., can more accurately represent a real life movement. As another example, the enhancement material durometer can be selected to be similar to cartilage in a joint with the primary material durometer selected to be similar to tissue covering the joint and movement of the animatronic may appear more realistic.

The foregoing description has broad application. While the provided embodiments describe a composite material skin for an animatronic figure, it should be appreciated that the concepts disclosed herein may equally apply to many types of artificial skins or coverings, including skins for mannequins, prosthetics, robots, and any other movable or non-movable device. Additionally, the method can be applied to various types of materials and components, such as tires (e.g., automobile, bicycle, etc.), flooring, belts (e.g., conveyor), sheet rubber goods, footwear, rubber toys, molded rubber goods, and so on.

For example, the method 200 can be used to inject enhancement materials into a sublayer of automobile tires. The enhancement material can then be used to track tread wear on the tires and/or can display a brand name, part information, serial number, or the like. In another example, the method can be used to create heat sensors where the enhancement material is heat sensitive and changes color with increases or decreases in temperature. In this example, the enhancement material can be deposited into a primary material to act as a sensor to indicate when the primary material is heated above or below a desired temperature. With an animatronic, this color change can be used to indicate problems with the internal mechanics that might not otherwise be apparent, allowing replacement of the mechanics before failure of the machine.

Accordingly, the discussion of any embodiment is meant only to be illustrative and is not intended to suggest that the scope of the disclosure, including the claims, is limited to these examples. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The phrases "at least one", "one or more", and "and/or", as used herein, are open-ended expressions that are both conjunctive and disjunctive in operation.

The term "a" or "an" entity, as used herein, refers to one or more of that entity. As such, the terms "a" (or "an"), "one or more" and "at least one" can be used interchangeably herein.

What is claimed is:

1. A method for altering at least one local property of a primary material, comprising:
   reducing an elasticity of the primary material, wherein the primary material is an artificial skin material;
   while the elasticity of the primary material is reduced, creating a delivery aperture through a portion of the primary material; and
   introducing through the delivery aperture a secondary material into the primary material.

2. The method of claim 1, further comprising applying a closure treatment to the primary material to close the delivery aperture.

3. The method of claim 2, wherein the closure treatment comprises heating the primary material.

4. The method of claim 3, wherein during the closure treatment the primary material is heated to approximately a glass transition of the primary material.

5. The method of claim 1, wherein the elasticity of the primary material is reduced through a thermal treatment.

6. The method of claim 5, wherein the thermal treatment is a heat treatment.

7. The method of claim 5, wherein the thermal treatment is a cooling treatment.

8. The method of claim 1, wherein the at least one local property comprises at least one of: color, thermal property, magnetic property, mechanical property, or optical property.

9. The method of claim 1, wherein a needle is used to create the delivery aperture and introduce the secondary material.

10. The method of claim 2, wherein the closure treatment comprises heating the primary material.

11. The method of claim 1, wherein the primary material is a thermoplastic elastomer.

12. An artificial skin manufacturing method comprising:
    thermally treating an artificial skin material until an elasticity of the artificial skin material drops below a predetermined level;
    creating a passage through the outer surface of the artificial skin material to an inner layer of the artificial skin material, wherein the passage is created while the artificial skin elasticity remains below the predetermined level; and
    injecting an enhancement material into the inner layer of the artificial skin material.

13. The artificial skin manufacturing method of claim 12, further comprising closing the passage to the inner layer of the artificial skin material.

14. The artificial skin manufacturing method of claim 13, wherein closing the passage to the inner layer of the artificial skin material comprises heating the artificial skin material to at least a glass transition temperature of the artificial skin material or a melting point of the artificial skin material.

15. The artificial skin manufacturing method of claim 12, wherein the artificial skin material is a thermoplastic elastomer.

16. The artificial skin manufacturing method of claim 12, wherein at an injection location, the enhancement material changes a local property of the artificial skin material.

17. The artificial skin manufacturing method of claim 16, wherein the local property comprises at least one of color, magnetism, optical characteristics, mechanical characteristics, or thermal characteristics.

18. The artificial skin manufacturing method of 16, wherein the outer surface of the artificial skin is pierced by a needle of an injection device.

19. The artificial skin manufacturing method of claim 12, wherein after injection, the enhancement material is visible through the outer surface of the artificial skin material.

20. The artificial skin manufacturing method of claim 12, further comprising shaping the artificial skin material into a desired shape.

21. The method of claim 1, wherein
the elasticity of the primary material is reduced by heating the primary material above a flow temperature, such that the primary material transitions from a first state to a second state; and
after the secondary material is introduced into the primary material, cooling the primary material below the flow temperature, such that the primary material returns to the first state.

22. The method of claim 21, wherein the delivery aperture is created by a needle, wherein
in the first state, the primary material is sufficiently elastic to prevent the needle from puncturing therethrough to create the delivery aperture; and
in the second state, the elasticity of the primary material is sufficiently reduced to allow the needle to puncture therethrough to create the delivery aperture.

\* \* \* \* \*